United States Patent [19]

Egert

[11] 4,317,375

[45] Mar. 2, 1982

[54] FLOWMETER WITH PRESSURE RELEASE

[75] Inventor: Allen C. Egert, Denton, Tex.

[73] Assignee: Victor Equipment Co., Denton, Tex.

[21] Appl. No.: 125,960

[22] Filed: Feb. 29, 1980

[51] Int. Cl.³ .............................................. G01F 1/22
[52] U.S. Cl. ................................ 73/861.55; 137/68 R
[58] Field of Search ........... 73/861.55, 861.56, 861.57, 73/199; 137/68 R

[56] References Cited

U.S. PATENT DOCUMENTS

| 2,258,023 | 10/1941 | McKernon | 73/861.55 |
| 2,655,041 | 10/1953 | Jacobsson | 73/861.55 X |
| 3,066,530 | 12/1962 | Stenberg | 73/861.55 X |
| 3,545,252 | 12/1970 | Springfield et al. | 73/15 X |
| 4,050,305 | 9/1977 | Evans et al. | 73/861.55 |
| 4,146,047 | 3/1979 | Wood et al. | 137/68 |
| 4,245,513 | 1/1981 | Clements et al. | 73/861.55 |

*Primary Examiner*—Herbert Goldstein
*Attorney, Agent, or Firm*—James C. Fails

[57] ABSTRACT

A flowmeter for monitoring and controlling the flow of gaseous fluid at a predetermined pressure characterized by a body having a sealingly received flowtube in the center surrounded by a cover having a vent passageway and, intermediate the two, a burst capsule sealingly connected with the flowtube and the vent passage of the cover so as to allow flow therebetween until its burst strength is exceeded and thereafter rupturing to vent the gaseous fluid and prevent an explosion. Preferably, the flowmeter has a valve in an outlet passageway for controlling the flow; and the flowtube and cover are transparent with a flow bob and variable passageway for monitoring flow in the manner of a rotameter; the rotameter bob and the indicia being visible to an operator controlling the flow. In the preferred embodiment, the flowmeter is formed of material that is not adversely affected by the gas; the burst capsule is emplaced sealingly intermediate the cover and the top of the flowtube and above the normal flow passages of the flowtube. The burst capsule is preferably formed of inert plastic material that will not contaminate the gas and that will burst without violence or trauma.

2 Claims, 7 Drawing Figures

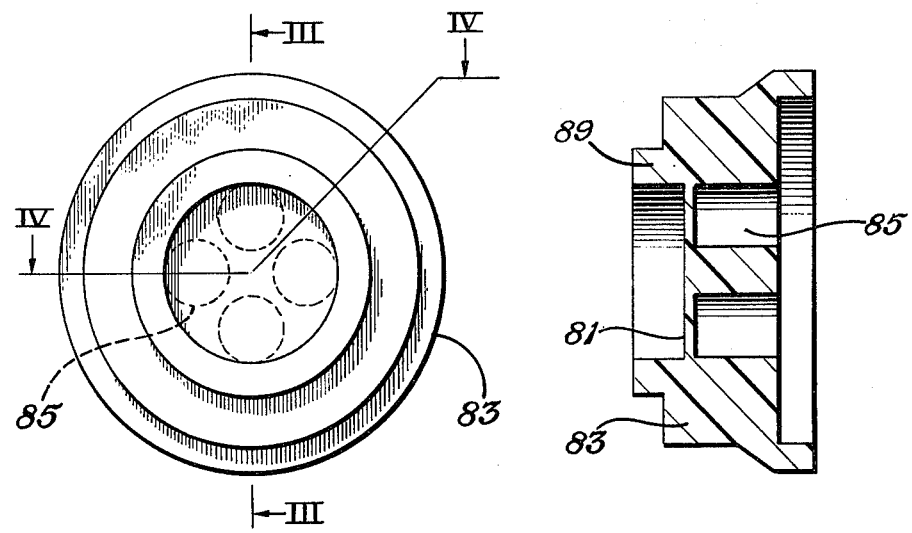
*Fig.2*   *Fig.3*
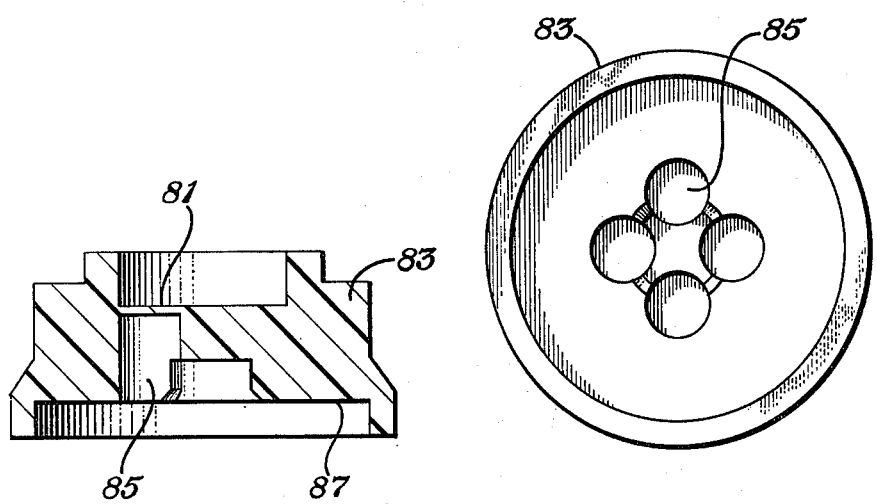
*Fig.4*   *Fig.5*

FLOWMETER WITH PRESSURE RELEASE

FIELD OF THE INVENTION

This invention relates to flowmeters for monitoring and controlling flow of a fluid. More particularly, this invention relates to a flowmeter affording clear visual indication of the rate of flow of medical or industrial gases or the like at relatively constant pressure to facilitate control by a nurse or person monitoring the flow of the gas.

DESCRIPTION OF THE PRIOR ART

A wide variety of types of flow controls have been employed for controlling flow of fluid, such as gaseous fluids. In the field of medical or industrial oxygen there are pecularities that have not been completely and satisfactorily solved. Industrial gases, such as helium, argon, torch fuels and the like have also presented problems in monitoring flow. Where rotameter type flowmeters have been employed, obstructions in the line downstream of the flowmeter or temporary malfunctions of an upstream regulator have increased the pressure intolerably and resulted in explosions of the plastic, transparent covers. These are traumatic and dangerous to operating personel.

Accordingly it can be seen that the prior art has not been totally satisfactory in providing a flowmeter that facilitates control of the flow of a gaseous fluid; yet, will prevent the danger and trauma of an explosion.

SUMMARY OF THE INVENTION

Accordingly, it is an object of this invention to provide a flowmeter for monitoring and controlling flow of a gaseous fluid at a predetermined pressure that obviates the disadvantages of the prior art and provides safety and accuracy.

It is a specific object of this invention to provide a flowmeter for monitoring and controlling the flow of a gaseous fluid that obviates the propensities toward explosions and the like and alleviates the deficiencies of the prior art.

These and other objects will become apparent from the descriptive matter hereinafter, particularly when taken in conjunction with the appended drawings.

In accordance with this invention there is provided a flowmeter for monitoring and controlling flow of the gaseous fluid at a predetermined pressure comprising:

a. a body having a centrally disposed flowtube-receiving recess and a cover-receiving recess and having respective inlet and outlet passageways connected respectively with the flowtube-receiving recess and the cover-receiving recess;

b. a flowtube sealingly received in the flowtube-receiving recess and having means for monitoring rate of flow of the gas, and having a passage for passing the gas to the outlet passageway through an annular passageway between the cover and the flowtube;

c. cover disposed about the flowtube and sealingly received in the cover-receiving recess; the cover having a vent passageway for venting the gas if a burst capsule is ruptured by excess pressures; and d. a burst capsule sealingly connected interiorly of the cover and intermediate the vent passage and the passage of the flowtube; the burst capsule having a diaphragm means for rupturing when a predetermined pressure is exceeded and thereby preventing an explosion.

In preferred embodiments, the cover and flowtube, with an indicia and flow bob and operating as a rotameter, are transparent for monitoring the flow rate and for calibrating the rate of flow against the position of the flow bob in a variable diameter passageway.

In flowing of the gas, pressure is maintained substantially constant by a regulator upstream of the flowmeter and a valve in the outlet passageway; the valve being readily accessible to the viewer of the flowmeter indicia and flow bob.

BRIEF DESCRIPTION OF THE DRAWINGS

FIG. 2 is a top plan view of the burst capsule of FIG. 1.

FIG. 3 is a cross sectional view taken along the lines of III—III of FIG. 2.

FIG. 4 is a cross sectional view taken along the lines of IV—IV of FIG. 2.

FIG. 5 is a bottom view of the burst capsule of FIG. 2.

DESCRIPTION OF THE PREFERRED EMBODIMENTS

This invention is widely useful in applications where liquid fluid is to be flowed or a gaseous fluid is to be flowed at a relatively constant pressure. Ordinarily, the liquid fluids do not create explosions and, hence, this invention is of less importance in the area of liquid fluids. It is in the area of controlling and monitoring flow of a gaseous fluid; such as, medical oxygen to a patient, or industrial gases; the gas being in the form of a relatively constant pressure gas, that this invention has its greatest usefulness; and it is in this environment that this invention will be described hereinafter.

Figure 1:
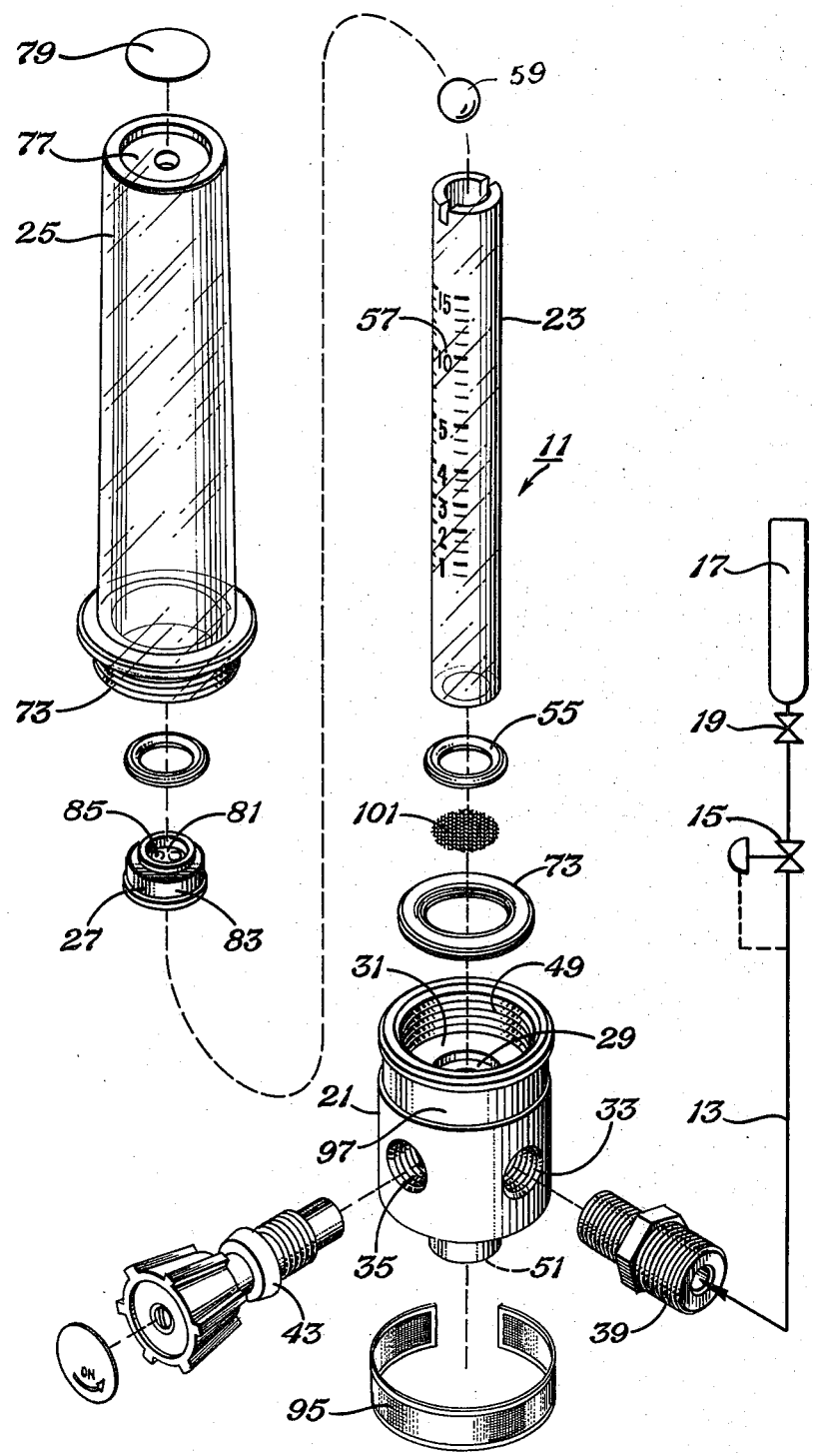
FIG. 1 is a disassembled isometric view of the flowmeter of this invention.

Referring to FIG. 1, the flowmeter 11 is illustrated connected via line 13 with constant pressure gas provided by regulator 15. The regulator 15 is provided gas from a container 17 used as a high pressure cylinder that has valve 19 that can be shut off.

Figure 7:
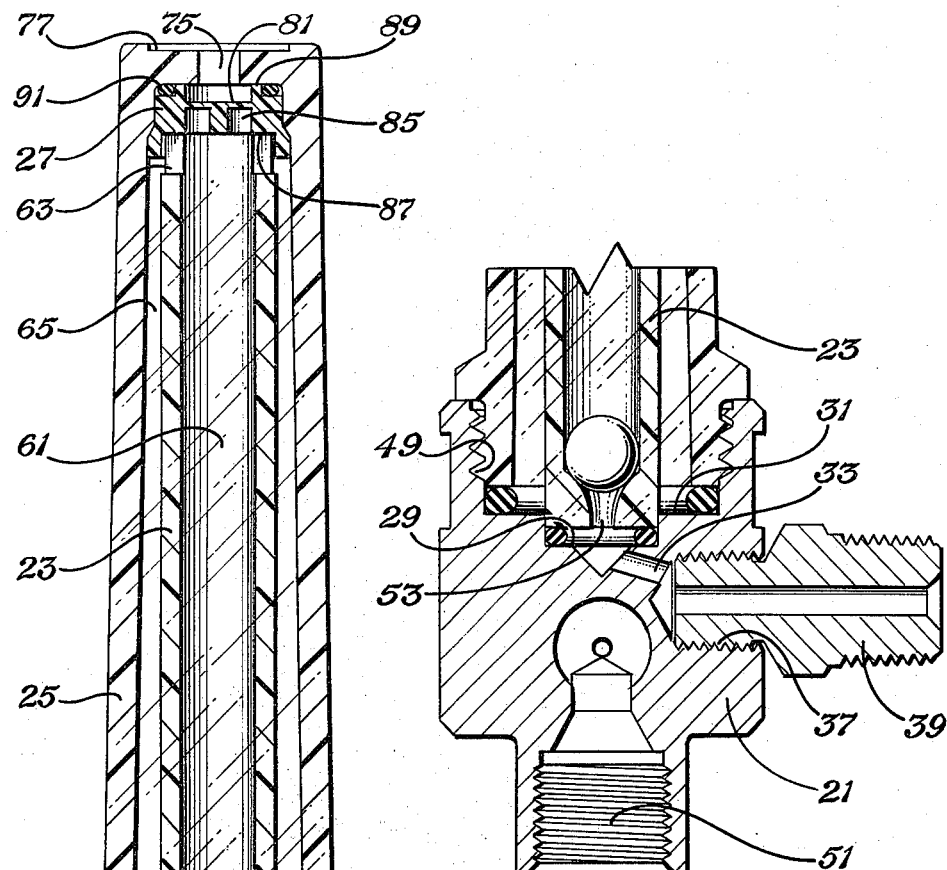
FIG. 7 is partial cross sectional view of the body of the flowmeter of FIG. 6 taken so as to show the inlet passageway.
Figure 6:
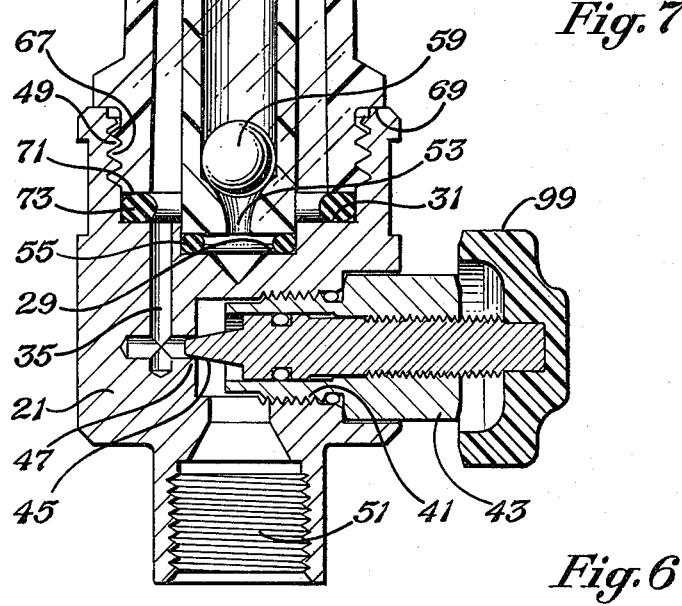
FIG. 6 is a cross sectional view of the flowmeter of FIG. 1 in the assembled configuration.

Referring to FIGS. 1, 6 and 7, the flowmeter 11 has the elements of a body 21, a flowtube 23, a cover 25, and a burst capsule 27. All of the elements are designed to withstand the predetermined pressure for a predetermined end use; for example, from 25 to 80 psig (pounds per square inch gauge).

The body 21 has a centrally disposed flowtube-receiving recess 29 and a cover-receiving recess 31. The body 21 has respective inlet and outlet passageways 33, 35 connected respectively with the flowtube-receiving recess 29 and the cover-receiving recess 31. The body is formed of a material, such as a copper alloy metal, stainless steel, or other material, that is compatible with the gas being flowed therethrough. The respective passageways may be drilled, cast, threaded, as being tapped or the like. Specifically, the body has a threaded section 37, FIG. 7, for receiving a fitting 39 for affixing an inlet hose, tubing or the like for carrying the gas into the flowtube. As illustrated, the fitting 39 is not only screwed into the threaded section 37 but has an adhesive sealant, such as polyacrylate, polymethacrylate or polyepoxy adhesive, applied to the threads for sealing. The body also has a threaded section 41 in the outlet passageway for receiving a valve 43. The valve 43 has a tapered tip 45 that is moved inwardly and outwardly to meter the seat opening 47 for controlling the flow of gas. The body 21 also has a large threaded section 49 at its top for receiving a threaded bottom section of a cover. At its bottom end, the body 21 has a threaded section 51 for being connected with a line to a using accessory; for example, a hose to an oxygen tent. The latter is not shown, because it is conventional.

The inlet passageway 33 is connected with a central passage 53 of the flowtube 23 for flowing the gas upwardly therethrough.

The flowtube 23, FIGS. 1 and 6 is sealingly received as by being seated on a resilient seal 55, in the recess 29. The flowtube 23 is transparent, such as formed of polycarbonate or a similar clear plastic material. The flowtube has indicia 57, FIG. 1, for indicating graduations to show rates of flow. The rates of flow represent the time rate of flow of the gas, such as the oxygen, past a flow bob in the form of a sphere 59. The sphere, or ball, 59 rises upwardly in the flowtube 23 under the influence of greater flows. The diameter of the interior wall of the flowtube 23 increases monotonically upwardly such that there is a monotonically increasing differential area between the exterior of the ball 59 and the interior wall of the flowtube, or the wall of the central passageway 61. Consequently, the tube can be calibrated for the particular temperature and gas such that the indicia represent a certain volumetric rate of flow per unit time. This is then repeatable as the pressure and the temperature remains substantially constant as they do in the medical flow. This type of flow rate measuring device is best known by the rotameter principle.

The flowtube 23 has passages 63, illustrated as being disposed at the top, for allowing flow of the oxygen into the annular space 65 and thence to the outlet passageway. The top of the flowtube 23 is smooth for being sealingly received within a burst capsule 27, described later hereinafter.

The annular passageway 65 is between the flowtube 23 and the cover 25. The cover 25 is also transparent, being formed of polycarbonate or the like. The cover 25 has a threaded section 67 at its bottom end for being sealingly received within the threaded section 49 of the body 21. The cover is screwed downwardly until its shoulder 69 is sealingly received against the top of the body 21. The bottom 71 of the cover 25 is sealingly received, as by being compressed against resilient seal 73, in the recess 31. The cover 25 should be able to be sealed into the body 21 so as to hold a predetermined pressure; for example, 50 pounds per square inch gauge (psig) without leaking. Thus, it can be used for metering flow of industrial gases like helium-argon mixtures, as well as oxygen or the like.

The cover 25 has a vent passage 75 for venting gas in the event pressure gets too high and if the burst capsule 27 is ruptured. As illustrated the vent passage 75 is located at the top of the cover. If desired, a recess 77 can be provided for receiving a labeling disc 79, FIG. 1. Any such labeling disc must be capable of being ruptured by the flow of gas in the event there is a rupture of the burst capsule 27.

The burst capsule 27 is sealingly connected interiorly of the cover and intermediate the vent passage and the passage of the flowtube. The burst capsule has a diaphragm means 81, FIGS. 1, 2-5 and 6. The diaphragm means 81 is formed for rupturing when a predetermined pressure is exceeded and prevents an explosion. Specifically, the burst capsule 27 has a body 83 that contains a plurality of passageways 85 terminated by the diaphragm 81. The burst capsule 27 has a female recess 87, FIG. 6, adapted to received the top of the flowtube; and a male end 89 containing a resilient seal 91 adapted to sealingly engage the top of the cover 25. The burst capsule is preferably formed of a plastic material such as polyethylene or the like. Thus, the burst capsule is economical and may be replaced readily and inexpensively. Preferably, the burst capsules 27 are molded and the surfaces are free of imperfections and excessive mold flash. The bottom surface is free of pin holes and any kind of opening that would be caused by a partial fill of plastic in the injection molding process.

A band 95 is provided for affixing trademarks and the like. The band 95 is sealingly received in recess 97.

In operation, the flowmeter is connected as shown with the valve appropriately inserted. Additional lines from the source of gas 17 and to using apparatus (not shown) are connected. The regulator 15 is set to provide desired pressure the operator then opens the valve 43 by unscrewing the handle 99 until the ball 59 rests at the appropriate indicia 57 to give the desired rate of flow of the gas. The gas may be medical oxygen, argon-helium, or the like. A screen 101 is provided for keeping the gas free of particulate solids or the like. This rate continues if there are no inadvertent operations. In the event there is a malfunction of the regulator 15 allowing overflow pressure to exceed the predetermined maximum; for example, about two hundred psig; the diaphragm 81 ruptures and allows the gas to pass harmlessly out the passage 75.

Expressed otherwise, there is no explosion and no trauma or danger to the personnel.

Thereafter, the cover is disassembled and a new burst capsule 27 inserted in place and the cover reinstalled. The operation can then be continued routinely.

As will be appreciated, the types of materials may vary with the nature of the flow gas being flowed through the flowtube assembly 11. Such materials are usually well known to the art and the engineer will specify the design criteria to the manufacturer. The injection molded plastic capsule that serves as a burst capsule is located in the path of the flowing gas and the thin membrane, or diaphragm can be ruptured without danger, to relieve excessive pressure and be readily replaced.

Thus it can be seen that this invention obviates the disadvantages of the prior art and provides desired safety.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

I claim:

1. A flowmeter for monitoring and controlling flow of a gaseous fluid at a predetermined pressure comprising:
   a. a main body having a centrally disposed flowtube-receiving recess and a cover-receiving recess and having respective inlet and outlet passageways connected respectively with said flowtube-receiving recess and said cover-receiving recess;
b. a flowtube sealingly received in said flowtube-receiving recess and having means for monitoring rate of flow of said gaseous fluid and disposed downstream thereof a passage for passing said gaseous fluid to said outlet passageway; said flowtube including a flowbob and having the central passageway of said flowtube varying in diameter longitudinally thereof so as to provide a monotonically increasing differential area between said flowbob and interior walls of said flowtube; and indicia for calibrating and monitoring the flow of said gaseous fluid;
c. a cover disposed about said flowtube and sealingly received in said cover-receiving recess; said cover having a vent passage for venting said gaseous fluid if a pressure burst capsule is ruptured; said flowtube and said cover being transparent; and
d. a burst capsule sealingly connected interiorly of said cover and intermediate said vent passage and said passage of said flowtube; said burst capsule having a diaphragm for rupturing when a predetermined pressure is exceeded and thereby preventing an explosion; said burst capsule having a a body containing said diaphragm, a female recess adapted to receive the top of said flowtube and a male end adapted to sealing engage the top of said cover; said top of said flowtube having laterally extending passageways for flow of said gaseous fluid past said burst capsule in normal flow; said vent passage being disposed in top of said cover above said burst capsule.

2. A flowmeter for monitoring and controlling flow of a gaseous fluid at a predetermined pressure comprising:
a. a main body having a centrally disposed flowtube-receiving recess and a cover-receiving recess and having respective inlet and outlet passageways connected respectively with said flowtube-receiving recess and said cover-receiving recess;
b. a flowtube sealingly received in said flowtube-receiving recess and having means for monitoring rate of flow of said gaseous fluid and disposed downstream thereof a passage for passing said gaseous fluid to said outlet passageway;
c. a cover disposed about said flowtube and sealingly received in said cover-receiving recess; said cover having a vent passage for venting said gaseous fluid if a pressure burst capsule is ruptured; and
d. a burst capsule sealingly connected interiorly of said cover and intermediate said vent passage and said passage of said flowtube; said burst capsule having a diaphragm for rupturing when a predetermined pressure is exceeded and thereby preventing an explosion; said burst capsule having a body containing a plurality of passageways extending longitudinally thereof and terminated by said diaphragm, a female recess adapted to receive the top of said flowtube and a male end adapted to sealingly engage the top of said cover; said top of said flowtube having laterally extending passageways for flow of said gaseous fluid past said burst capsule in normal flow; said vent passage being disposed in said top of said cover above said burst capsule.

* * * * *